United States Patent
Vyas et al.

(10) Patent No.: US 10,863,027 B1
(45) Date of Patent: *Dec. 8, 2020

(54) SYSTEM AND METHOD FOR DISTRIBUTING AN AGENT INTERACTION FOR EVALUATION BASED ON THE QUALITY OF SERVICE

(71) Applicant: NICE LTD, Ra'anana (IL)

(72) Inventors: Rahul Vyas, Jodhpur-Rajasthan (IN); Piyush Shirke, Pune (IN)

(73) Assignee: NICE LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,471

(22) Filed: Feb. 24, 2020

Related U.S. Application Data

(63) Continuation of application No. 16/594,093, filed on Oct. 7, 2019, now Pat. No. 10,616,413.

(51) Int. Cl.
| | |
|---|---|
| H04M 3/00 | (2006.01) |
| H04M 5/00 | (2006.01) |
| H04M 3/51 | (2006.01) |
| H04M 3/22 | (2006.01) |
| H04M 3/42 | (2006.01) |

(52) U.S. Cl.
CPC ....... *H04M 3/5175* (2013.01); *H04M 3/2227* (2013.01); *H04M 3/2236* (2013.01); *H04M 3/42221* (2013.01); *H04M 3/5183* (2013.01)

(58) Field of Classification Search
CPC ............. H04M 3/2227; H04M 3/2236; H04M 3/42221; H04M 3/5175; H04M 3/5183
USPC .................................................. 379/265.03
See application file for complete search history.

(56) References Cited

U.S. PATENT DOCUMENTS

| | | | | |
|---|---|---|---|---|
| 9,667,317 | B2 * | 5/2017 | Gross | H04B 3/52 |
| 9,735,833 | B2 * | 8/2017 | Gross | H04W 4/021 |
| 9,769,128 | B2 * | 9/2017 | Gross | H04L 63/0428 |
| 9,967,173 | B2 * | 5/2018 | Gross | H04L 45/126 |
| 10,264,586 | B2 * | 4/2019 | Beattie, Jr. | H04W 72/046 |
| 10,528,721 | B2 * | 1/2020 | Sood | G06F 9/4406 |
| 10,616,413 | B1 * | 4/2020 | Vyas | H04M 3/5183 |
| 2008/0219243 | A1 * | 9/2008 | Silverman | H04L 65/80 370/352 |
| 2014/0314215 | A1 * | 10/2014 | Duva | H04M 3/51 379/88.01 |

(Continued)

*Primary Examiner* — Khai N. Nguyen
(74) *Attorney, Agent, or Firm* — Soroker Agmon Nordman

(57) ABSTRACT

A computerized system in a cloud-based computing environment for preventing an evaluation of agent recording segments having bad customer sentiment due to low network Quality of Service (QoS), is provided herein. The system may include a Session Border Controller to send metadata related to a regulated network QoS to a database; a media server to store the call interaction; an Interaction Manager (IM) module to extract metadata related to the regulated network QoS; an Indexer Micro-Service to listen to real-time data streaming service and to index and store the metadata related to the regulated network QoS, when new metadata arrives; a Multi-Channel Recording unit to retrieve: an interaction call; and indexed metadata from the document-oriented database; a Quality Planner Micro-Service to: read MOS score for the call interaction; distribute a call interaction for evaluation when the read MOS score is above a predefined threshold, according to a predefined quality plan.

14 Claims, 6 Drawing Sheets

(56) References Cited

U.S. PATENT DOCUMENTS

| | | | |
|---|---|---|---|
| 2016/0036972 A1* | 2/2016 | Ristock | H04M 3/5175 |
| | | | 379/266.1 |
| 2016/0036980 A1* | 2/2016 | Ristock | H04M 3/5166 |
| | | | 379/265.12 |
| 2016/0173693 A1* | 6/2016 | Spievak | H04M 3/42042 |
| | | | 379/265.09 |
| 2017/0347258 A1* | 11/2017 | Carbone | H04W 4/24 |
| 2018/0114012 A1* | 4/2018 | Sood | G06F 21/53 |

* cited by examiner

SYSTEM AND METHOD FOR DISTRIBUTING AN AGENT INTERACTION FOR EVALUATION BASED ON THE QUALITY OF SERVICE

RELATED APPLICATIONS

This application claims priority as a continuation from application Ser. No. 16/594,093 dated Oct. 7, 2019, now U.S. Pat. No. 10,616,413, the disclosure of which is incorporated herein by reference.

TECHNICAL FIELD

The present disclosure relates to the field of network quality of service of a call and its impact on customer sentiment to eliminate bad rating of agents by evaluators.

BACKGROUND

The performance of agents which are providing service to customers is being constantly evaluated and for that purpose call interactions are recorded for later on evaluation and rating. From time to time, when the customers have issues to be resolved by the agents, the Quality of Service (QoS) of the network in the contact center interrupts the agent to bring the customer's issue to resolution. This may impact customer's sentiment which later on may influence the agent's rating during the evaluation phase.

In other words, sometimes when an agent is not able to resolve the query of the customer due to low QoS it may impact customer's sentiment due to which agent rating may be impacted during evaluation. Furthermore, when distributing the call interaction for evaluation without checking the network QoS of the call interaction, then it may unnecessarily slow down the sampling rate of the distribution cycle.

The slowdown in the sampling rate of the distribution cycle may occur, i.e., the time required to distribute the call interactions, when distributing n interactions and out of the n interactions x interactions have poor quality e.g., invalid, then more computing resources are required for distributing the n interaction than the n interactions minus the x interactions i.e., (n-x). Therefore, by checking network QoS and filtering out x interactions to distribute (n-x) valid interactions, reducing computing resources and the time that is required to distribute the interactions in comparison with the computing resources and the time that is required to distribute the n interactions.

US patent publication US 2017/0339271 is used for playback of recording based on packet loss ratio responsive to concurrently recording on a plurality of recorders a telephonic interaction constructing a plurality of playlists, and according to faults identified while recording the plurality of playlists evaluating a quantitative quality score for each playlist in the plurality of playlists and presenting the play lists in a prioritized order according to the scores thereof. However, packet loss is not a sufficient parameter to describe the overall call quality. Packet loss is a network layer parameter which depends upon network connection such as router and other associated hardware. However, there may be a good audio which is suffering from packet loss.

Therefore, there is a need for a system and method that will take into account several parameters that influence network Quality of Service (QoS) before a call recording is forwarded to evaluation.

SUMMARY

There is thus provided, in accordance with some embodiments of the present disclosure, a computerized system in a cloud-based computing environment for preventing an evaluation of agent recording segments which are having bad customer sentiment due to low network quality of service.

In accordance with some embodiments of the present disclosure, the computerized system may include a Session Border Controller (SBC). The SBC may be configured to: control a received call interaction; regulate network Quality of Service (QoS); and send metadata related to the regulated network QoS to a table-oriented database in a cloud-based computing environment. The computerized system may further include a media server which may be configured to receive the call interaction from the SBC and send it to be stored on a voice recording storage service via a recorder when the call interaction ends.

In accordance with some embodiments of the present disclosure, the computerized system may include an Interaction Manager (IM) module in the cloud-based computing environment which may be configured to extract metadata related to the regulated network QoS of the recorded call interaction from the table-oriented database.

In accordance with some embodiments of the present disclosure, the computerized system may include a document-oriented database in the cloud-based computing environment for storing metadata related to the regulated network QoS of the recorded call interaction that is received from the IM module.

In accordance with some embodiments of the present disclosure, the received metadata related to the regulated network QoS of the recorded call interaction may comprise a mean opinion score (MOS).

In accordance with some embodiments of the present disclosure, the IM module may be configured to send the metadata to a real-time data streaming service for indexing by an Indexer Micro-Service (MS) in the cloud-based computing environment.

In accordance with some embodiments of the present disclosure, the computerized system may further include an Indexer Micro-Service (MS) in the cloud-based computing environment which may be configured to listen to real time data streaming service and when any new metadata arrives the Indexer MS may index and store the metadata related to regulated network QoS of the recorded call interaction into the document-oriented database.

In accordance with some embodiments of the present disclosure, as part of MS Architecture (Representational State Transfer (REST) API), the indexed data may be further retrieved from the document-oriented database to get the metadata related to the regulated network QoS of the recorded call interaction. Once data is available in the ElasticSearch service (ES) then Quality Planner (QP) Micro Service (MS) may use REST API Call to send a call request to Multi-Channel Recording (MCR) MS. The MCR MS is responsible for getting call interactions details which are stored inside ES i.e., document-oriented database by querying into ES as per the Quality Planner criteria and sending the response back to the Quality Planner as further explained in detail in FIG. 1C.

In accordance with some embodiments of the present disclosure, the computerized system may further include a Multi-Channel Recording (MCR) unit. As a search Micro Service (MS), the MCR may be configured to retrieve: an interaction call; and indexed metadata from document-oriented database related to the regulated network QoS of the recorded call interaction. The MCR may be hosted inside a docker container such as Amazon EC2 instance.

In accordance with some embodiments of the present disclosure, the computerized system may further include a Quality Planner Micro-Service (QPMS). The QPMS may be configured to: read MOS score for the call interaction; and distribute a call interaction for evaluation when the read MOS score is above a predefined threshold, according to a predefined Quality Plan.

In accordance with some embodiments of the present disclosure, the real-time data streaming service is Amazon Kinesis Data Streams.

In accordance with some embodiments of the present disclosure, the document-oriented database is Elastic Search (ES). ES is a document-oriented database that is designed to store, retrieve, and manage document-oriented or semi-structured data. Recorded data may be stored inside ES in JSON document form.

In accordance with some embodiments of the present disclosure, the IM module may be configured to send the extracted metadata related to the regulated network QoS of the recorded call interaction using Amazon Kinesis Data Streams.

In accordance with some embodiments of the present disclosure, the Indexer Micro-Service (MS) may be configured to store data read from the kinesis stream in JavaScript Object Notation (JSON) format using Index API in the document-oriented database.

In accordance with some embodiments of the present disclosure, the voice recording storage service is Amazon simple storage service (S3).

In accordance with some embodiments of the present disclosure, the table-oriented database used to store conversational quality metrics (CQM) or Quality of Service (QoS) is MySQL database.

There is further provided in accordance with some embodiments of the present disclosure, a computerized method for preventing an evaluation of agent recording segments which are having bad customer sentiment due to low network quality of service.

In accordance with some embodiments of the present disclosure, the computerized method may include: controlling a received call interaction; regulating network Quality of Service (QoS); storing metadata related to the regulated network QoS; storing the received call interaction on a storage service when the call interaction ends. The voice recording segments which may be call recording files in mp3 format or in mp4 format, may be stored in a storage service such as Amazon simple storage service (S3) bucket which is a public cloud storage resource that is available in Amazon Web Services (AWS). Accordingly, when a file is uploaded to Amazon simple storage service (S3) bucket it is stored as an S3 object. The S3 Objects consist of the file's data and metadata that describes the object. The protocol used for the call recording may be Session Recording Protocol (SIPREC) which is an open SIP-based protocol for call recording.

In accordance with some embodiments of the present disclosure, after storing the received call interaction on a storage service when the call interaction ends, the computerized method using a cloud-based computing environment is further extracting metadata related to the regulated network QoS of the recorded call interaction from a table-oriented database and receiving metadata related to the regulated network QoS of the recorded call interaction.

The received metadata related to the regulated network QoS of the recorded call interaction comprising a Mean Opinion Score (MOS). The computerized method may include: sending the metadata to a real-time data streaming service for indexing; retrieving an interaction call and indexed metadata related to the regulated network QoS of the recorded call interaction from a document-oriented database; reading MOS score for the call interaction; and distributing a call interaction for evaluation when the read MOS score is above a predefined threshold according to a predefined quality plan.

BRIEF DESCRIPTION OF THE DRAWINGS

For the present disclosure, to be better understood and for its practical applications to be appreciated, the following Figures are provided and referenced hereafter. It should be noted that the Figures are given as examples only and in no way limit the scope of the disclosure. Like components are denoted by like reference numerals.

DETAILED DESCRIPTION

Figure 1A:
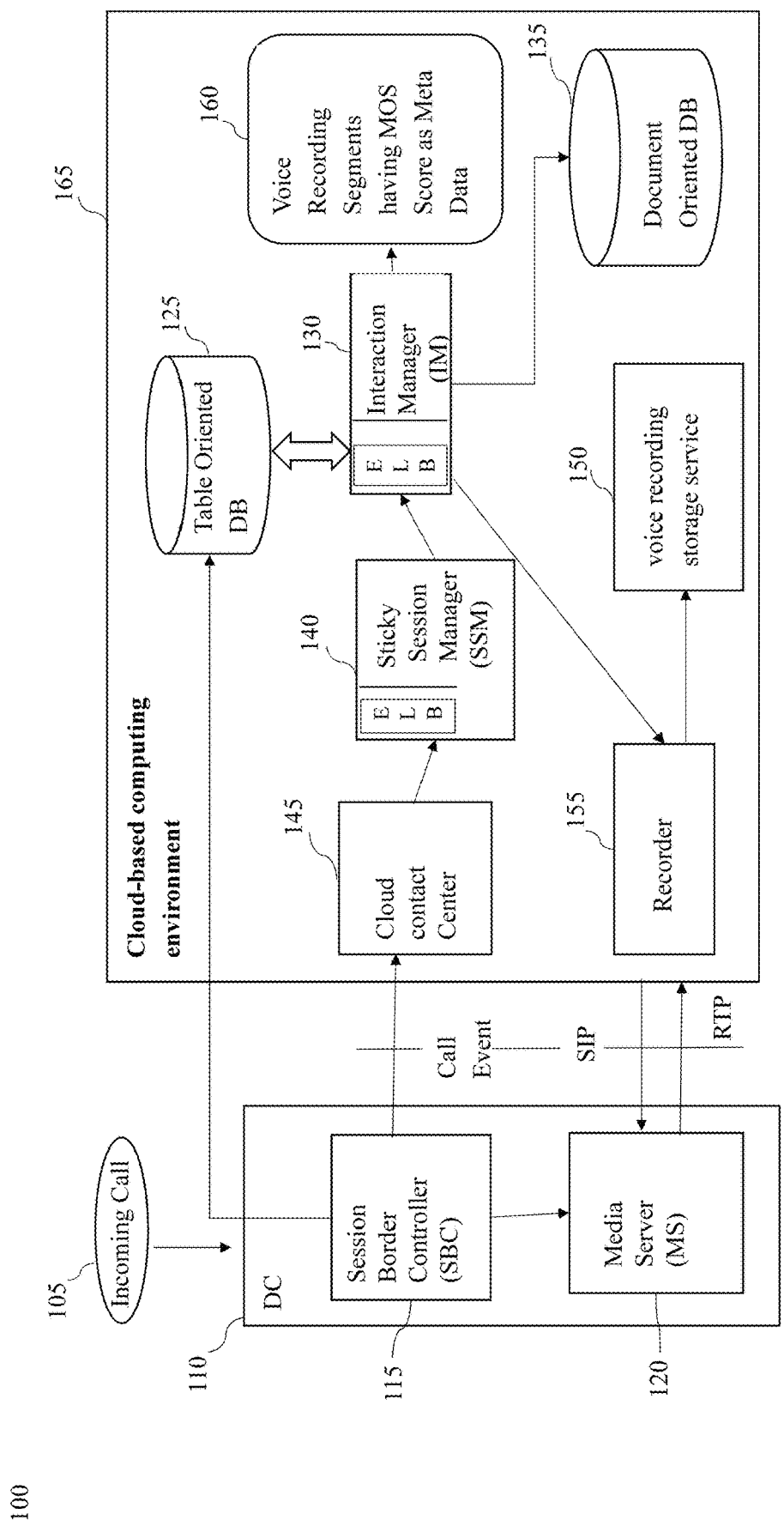
FIGS. 1A-1C is a diagram of a system 100 for preventing an evaluation of agent recording segments which are having bad customer sentiment due to low network quality of service, according to some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "customer sentiment" or "agent sentiment" as used herein refers to the language that has been used during an interaction. During an evaluation process rating of customer sentiment may be provided based on the nature of the language if it has been mostly positive, negative, or neutral language.

The term "network bandwidth" or "network capacity" as used herein refers to available data transfer.

The term "network throughput" as used herein refers to the amount of data that has been successfully transferred over the network in a predetermined period of time.

The term "packet" as used herein refers to network packets which are units that are carrying user data and control information. Commonly the control information is in the header of the packet.

The term "network delay" or "latency" or "jittering" as used herein refers to any network issue causing packet transfer to be slower than usual.

The term "data loss" or "data errors" as used herein refers to packets dropped or lost in transmission and delivery.

The term "network performance" as used herein refers to measurements of various network components such as network bandwidth or capacity, network throughput, network delay, latency and jittering. Any network issue that is causing packet transfer to be slower than usual and data loss and network errors.

The term "network hardware" as used herein refers to the network equipment or the devices which are required for communication between devices in a computer network.

The term "codec" as used herein refers to a device or a computer program for encoding or decoding a digital data stream or signal.

The term "The International Telecommunication Union (ITU)" as used herein refers to the United Nations specialized agency in the field of telecommunications, information and communication technologies (ICTs). The ITU Telecommunication Standardization Sector (ITU-T) is a permanent organ of ITU. ITU-T is responsible for studying technical, operating and tariff questions and issuing Recommendations on them with a view to standardizing telecommunications on a worldwide basis.

The term "E-model" as used herein refers to a computational model for use in transmission planning.

The term "ITU-T recommendation G.107" as used herein refers to the ITU-T that is dealing with transmission systems and media, digital systems and networks. Recommendation ITU-T G.107 describes a computational model, known as the E-model, that is used as a transmission planning tool for assessing the combined effects of variations in several transmission parameters that affect the conversational quality of 3.1 kHz handset telephony. This computational model can be used, for example, by transmission planners to help ensure that users will be satisfied with end-to-end transmission performance whilst avoiding over-engineering of networks. The primary output from the model is the "rating factor" R but this may be transformed to provide estimates of customer opinion.

The term "R-Factor" as used herein refers to a value that is derived from metrics such as latency, jitter, and packet loss per ITU-T Recommendation G.107. The R-Factor value aids in quickly assessing the quality-of-experience for Voice over IP (VoIP) calls on the network. Typical scores range from 50 (bad) to 90 (excellent).

The term "Mean Opinion Score (MOS)" as used herein refers to ranking of the quality of voice and video sessions. Most often judged on a scale of 1 (bad) to 5 (excellent). For Example,

| Rating | Label |
| --- | --- |
| 5 | Excellent |
| 4 | Good |
| 3 | Fair |
| 2 | Poor |
| 1 | Bad |

All the components in the network chain from the sender to the receiver might decrease the rating of quality of the voice and video sessions and may cause a drop in MOS. The components may include: network hardware, network bandwidth, network jitter, network latency, packet loss and codec. The MOS value may be also derived from the R-Factor per ITU-T Recommendation G.107, which measures VoIP calls quality.

| MOS | R-Factor | Quality | Impairment |
| --- | --- | --- | --- |
| 5 | 90-100 | Excellent | Imperceptible |
| 4 | 80-90 | Good | Perceptible but not annoying |
| 3 | 70-80 | Fair | Slightly annoying |
| 2 | 50-70 | Poor | Annoying |
| 1 | <50 | Bad | Very annoying |

The term "Amazon Kinesis Data Streams (KDS)" as used herein refers to a service that is used to collect and process large streams of data records in real-time.

The term "Session Initiation Protocol (SIP)" as used herein refers to a communications protocol for signaling and controlling multimedia communication sessions in applications of Internet telephony for voice and video calls. SIP includes requests which initiate a functionality of the protocol. For example, the request "invite" initiates a dialog for establishing a call. The request "ACK" confirm that an entity has received a response to an "invite" request.

The term "Real Time Protocol (RTP)" as used herein refers to a network protocol for delivering audio and video over IP networks. RTP is used in communication and entertainment systems that involve streaming media, such as telephony, video teleconference applications including WebRTC, television services and web-based push-to-talk features. RTP typically runs over User Datagram Protocol (UDP). RTP is used in conjunction with the RTP Control Protocol (RTCP). While RTP carries the media streams (e.g., audio and video), RTCP is used to monitor transmission statistics and quality of service (QoS) and aids synchronization of multiple streams. RTP is one of the technical foundations of Voice over IP and in this context is often used in conjunction with a signaling protocol such as the Session Initiation Protocol (SIP) which establishes connections across the network.

The term "Quality Planner (QP)" as used herein refers to a Micro Service (MS) that enables quality plans management from a centralized location. Quality plans may randomly select agent interactions based on predefined criteria, and then distribute those interactions to evaluators for evaluation and review. After a quality plan is created and activated by the QPMS, it samples interactions from the agents which are defined in the quality plan and send the relevant segments to evaluators for review. When a Quality Plan is created it is provided with a data range of the duration of the interaction call between an agent and a customer. Based on that data range, voice recording segments of call interactions may be retrieved from document-oriented tables in the cloud-based computing environment. For example, when retrieving x interactions of agent x, y interactions of agent y, z interactions of agent z and so on from the database in the cloud-based computing environment, the QP may randomly select any agent from the retrieved agents and then apply filter criteria to distribute the interaction call to an evaluator which is one of a plurality of evaluators.

The term "Amazon simple storage service (S3)" as used herein refers to an Amazon service which is a public cloud storage resource available in AWS.

The term "MySQL" as used herein refers to a table-oriented database.

The term "Amazon Web Services (AWS)" as used herein refers to a service of an on-demand cloud computing platforms that Amazon provides.

The term "Elastic Compute Cloud (EC2)" as used herein refers to a scalable computing capacity in the AWS cloud.

The term "Elastic Load Balancing (ELB)" as used herein refers to a load-balancing service in a cloud-based computing environment such as Amazon Web Services (AWS) deployments. ELB automatically distributes incoming application traffic and scales resources to meet traffic demands. The ELB may be attached for each Micro-Service (MS) instance. In a non-limiting example, for each database such as MySQL instance an ELB may be attached to it. The purpose of automatic scaling is to automatically increase the size of Auto Scaling group when demand for resources goes up and to decrease it when demand goes down. As capacity is increased or decreased, the Amazon EC2 instances being added or removed must be registered or deregistered with a load balancer. This enables an application to automatically distribute incoming web traffic across such a dynamically changing number of instances.

The term "Session Border Controller (SBC)" as used herein refers to a dedicated device that protects and regulates IP communications flows. SBCs are used to regulate all forms of real-time communications including VoIP, IP video, text chat and collaboration sessions. SBCs manipulate IP communications signaling and media streams, providing a variety of functions including: security, Multivendor Interoperability, Protocol Interworking, Quality of Service (QoS), and Session Routing.

The term "JavaScript Object Notation (JSON) format" as used herein refers to a lightweight format for storing and transporting data.

The term "Micro Service (MS)" as used herein refers to an architectural style that structures an application as a collection of services.

The term "InContact Core" as used herein refers to a cloud Contact Center core.

The term "Sticky Session Manager (SSM)" as used herein refers to a generic router responsible for routing an event to the same target. Routing an event to the same target is important because an event that is received from InContact core should be forwarded to the same Interaction Management (IM) instance. For every SSM an ELB service is attached to it for scaling purposes.

The term "Interaction Manager (IM) service" as used herein refers to a microservice that is responsible for events (CTI/CDR) which are received from the call center through SSM. The main purpose of this service is to manage the state of every CTI call (event) and send a recording request to the relevant recorder. Once the call is finished, the IM sends the segment to the Kinesis.

Therefore, there is a need for a system and method that will take into account several parameters that influence Quality of Service (QoS) before a call recording is forwarded to evaluation.

The embodiments taught herein solve the technical problem of determining a bad network QoS of a call interaction and preventing it from distribution to evaluation. Thus, preventing an evaluation of agent recording segments which are having bad customer sentiment due to low network QoS.

The embodiments taught herein relating to contact interactions in a Contact Center (CC) with contact interactions between a customer and an agent i.e., a CC representative is merely shown by way of example and technical clarity, and not by way of limitation of the embodiments of the present disclosure. The embodiments herein for effective coaching by automatically pointing on an influencer on measured performance may be applied on any customer service channel such as, Interactive Voice Response (IVR) or mobile application. Furthermore, the embodiments herein are not limited to a CC but may be applied to any suitable platform that is providing customer service channels.

Figure 1B:
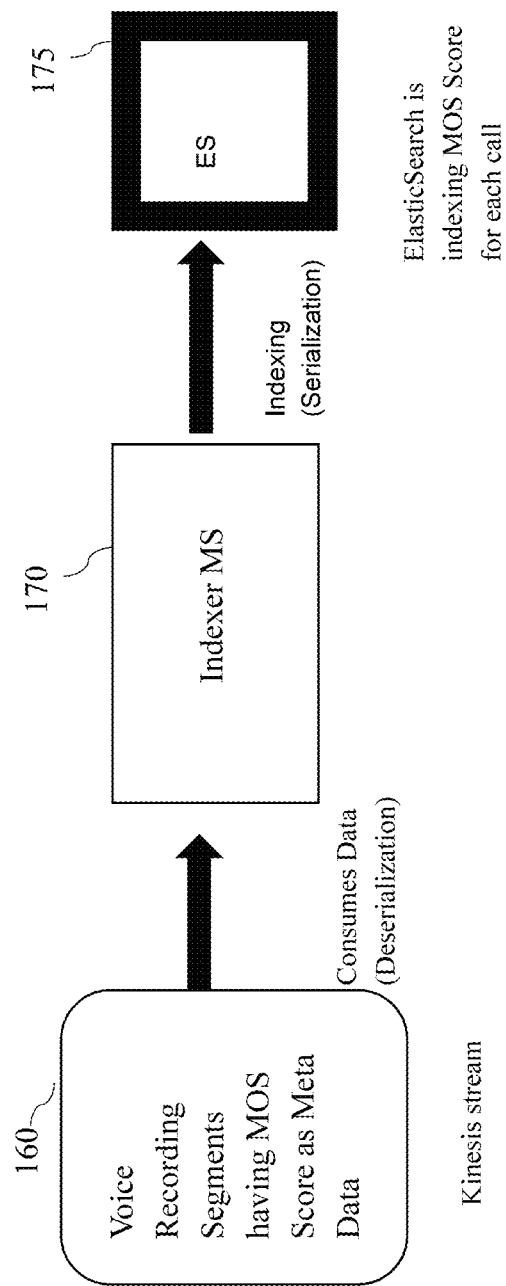
Figure 1C:
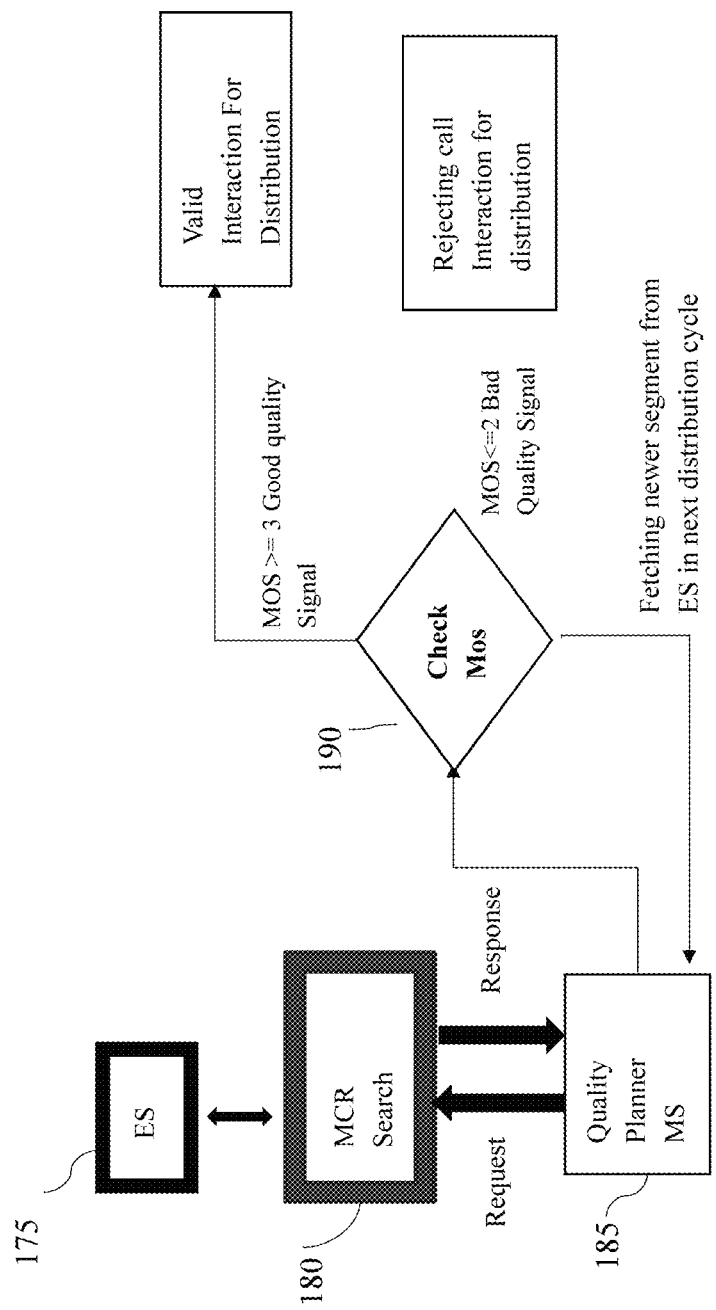

FIGS. 1A-1C is a diagram of a system 100 for preventing an evaluation of agent recording segments which are having bad customer sentiment due to low network QoS, according to some embodiments of the present disclosure.

According to some embodiments, a Data Center (DC) 110 may comprise session recording components. The DC may comprise: a Session Border Controller (SBC) 115 and a Media server (MS) 120. The Session Border Controller (SBC) 115 may be configured to control a received call interaction, such as an incoming call 105 and regulate network Quality of Service (QoS). During the interaction between the SBC 115 and the MS 120, the SBC 115 may track metadata related to the regulated network QoS and after the call interaction has ended the SBC 115 may send the metadata related to the regulated network QoS to a table-oriented database 125.

According to some embodiments, the MS 120 may be configured to receive the call interaction from the SBC 115 and send it to be stored on a storage service when the call interaction ends.

According to some embodiments, system 100 may further include an Interaction Manager (IM) module 130. The IM module 130 may be configured to extract metadata related to the regulated network QoS of the recorded call interaction from the table-oriented database 125. For each IM instance an ELB service is attached to it for scaling purposes.

According to some embodiments, when a new call interaction arrives in the contact center then, In cloud contact center such as cloud contact center 145, e.g., a contact core service sends a new CTI (Computer Telephony Integration) event to a generic router such as Sticky Session Manager (SSM) 140 as received from the SBC 115 and it routes the event to the Interaction Manger (IM) 130 and the IM 130 sends a request to the Voice recorder Micro Service 155 to fetch the recording information.

According to some embodiments, the Voice Recorder Microservice 155 is responsible for capturing the audio data that is received from cloud contact media server 145 such as InContact's Media Server, by receiving RTP (Real-Time Protocol) audio packets after sending a SIP (Session Initiation Protocol) Invite request.

According to some embodiments, once the call interaction has ended, then voice recorder MS archives the file to the voice recording storage service, such as voice recording storage service 150. In a non-limiting example, the voice recording storage service 150 may be Amazon simple storage service (S3) bucket. SBC 115 may calculate Mean Opinion Score (MOS) based on RTP Control Protocol (RTCP) packets and a predefined algorithm and store call detail records (CDRs) in a table-oriented database such as table-oriented database 125. The table-oriented database 125 may be for example, MySQL database.

According to some embodiments, data center 110 may be connected to a cloud-based computing environment 165. The cloud-based computing environment may be Amazon Web Services (AWS).

According to some embodiments, an Interaction Manager (IM) such as IM 130 may get call detail records for the completed calls from the table-oriented database 125. The IM 130 may build the data model using the call detail records which include MOS score, and then send the voice recording data to a real-time data streaming service 160 such as Amazon kinesis stream.

According to some embodiments, SBC 115 may calculate the MOS once the call ends, based on information that is retrieved from RTCP packets header such as latency, jitter and packet loss and algorithm used as per the industry common standards.

In a non-limiting example, the calculation of MOS may be performed according to Conversation Quality Metric (CQM). CQM is used in reference to any method or methods chosen to measure the quality of a VoIP call, and the term Conversation Quality Metric Score (CQMS) is used in reference to the numerical representation of a CQM. CQMS may refer to MOS, RTCP data, or other available quality information at either or both endpoints (since audio quality at either end can affect the overall conversation).

In a non-limiting example, ITU-T G.107 may be a computational model used by SBC 115 to calculate the MOS. Rating Factor (R-Factor) and Mean Opinion Score (MOS) are two commonly-used measurements of overall VoIP call quality.

According to some embodiments, system 100 may further include a document-oriented database 135 for storing metadata related to the regulated network QoS of the recorded call interaction that is received from the IM module 130.

According to some embodiments, the received metadata related to the regulated network QoS of the recorded call interaction includes a mean opinion score (MOS).

According to some embodiments, the IM module 130 may be configured to send the voice recording segments having MOS score as metadata 160 to a real-time data streaming service such as kinesis stream once the call ends for indexing by an Indexer Micro-Service (MS).

According to some embodiments, system 100 may include an Indexer Micro-Service (MS) 170. The Indexer MS 170 may be configured to listen to real time data streaming service and when new metadata arrives it may index and store the metadata related to regulated network QoS of the recorded call interaction into the document-oriented database 135. The document-oriented database 135 may be a Dynamo database.

According to some embodiments, Indexer MS 170 may be continuously listening to the kinesis stream and once the data record arrives inside kinesis stream then the Indexer MS 170 indexes the call records by using index API and after that for each call records there may be MOS available inside Elastic Search (ES) 135. The index API adds or updates a JSON document in a specific index, making it searchable.

According to some embodiments, as part of Micro Service Architecture (Representational State Transfer (REST) API), the indexed data may be further retrieved from the document-oriented database 135 to retrieve the metadata related to the regulated network QoS of the recorded call interaction.

According to some embodiments, system 100 may include a Multi-Channel Recording (MCR) unit 180 may be configured to retrieve: an interaction call; and indexed metadata from document-oriented database 130 related to the regulated network QoS of the recorded call interaction, according to a predefined quality plan created via Quality Planner Micro-Service 185.

According to some embodiments, the Quality Planner Micro-service 185 fetches the data from elastic search service 135 as per the plan duration of recorded segments, Quality Planner Micro-service may check MOS values. In a non-limiting example, If the MOS is greater than or equal to '3' then it may indicate that the voice quality of a call is good and it is a valid interaction for an evaluation of the agent, hence it will distribute these segments to the evaluator and if the MOS is less than or equal to '2' it may indicate that the quality of signal is poor and hence it may reject these call recording segments from distribution to the evaluators.

According to some embodiments, the Quality Planner Micro-Service (QPMS) 185 may be configured to read MOS score for the call interaction and after checking MOS 190, to distribute a call interaction for evaluation when the read MOS score is above a predefined threshold, according to a predefined Quality Plan.

According to some embodiments, system 100 may capture MOS, which describes the overall network quality (QoS). Upon a good MOS score, call interactions are sent for evaluation. Thus, the agents are rated based on valid, correct and relevant interaction calls. Interaction calls with poor customer sentiment due to bad QoS which are invalid are discarded and not being sent for evaluation.

Figure 2A:
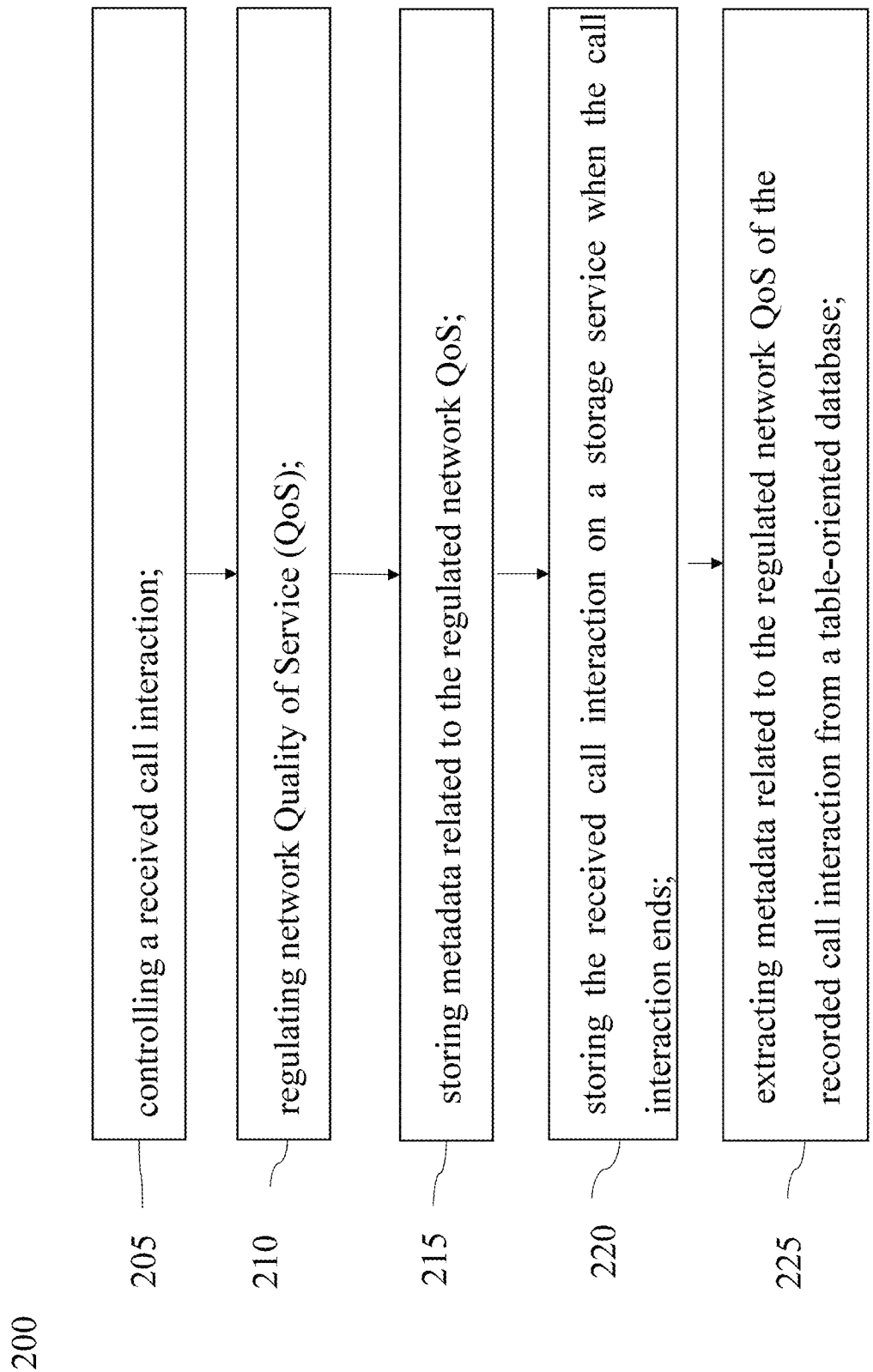
FIGS. 2A-2B illustrate a flow chart of a method for preventing an evaluation of agent recording segments which are having bad customer sentiment due to low network quality of service, according to some embodiments of the disclosure.
Figure 2B:
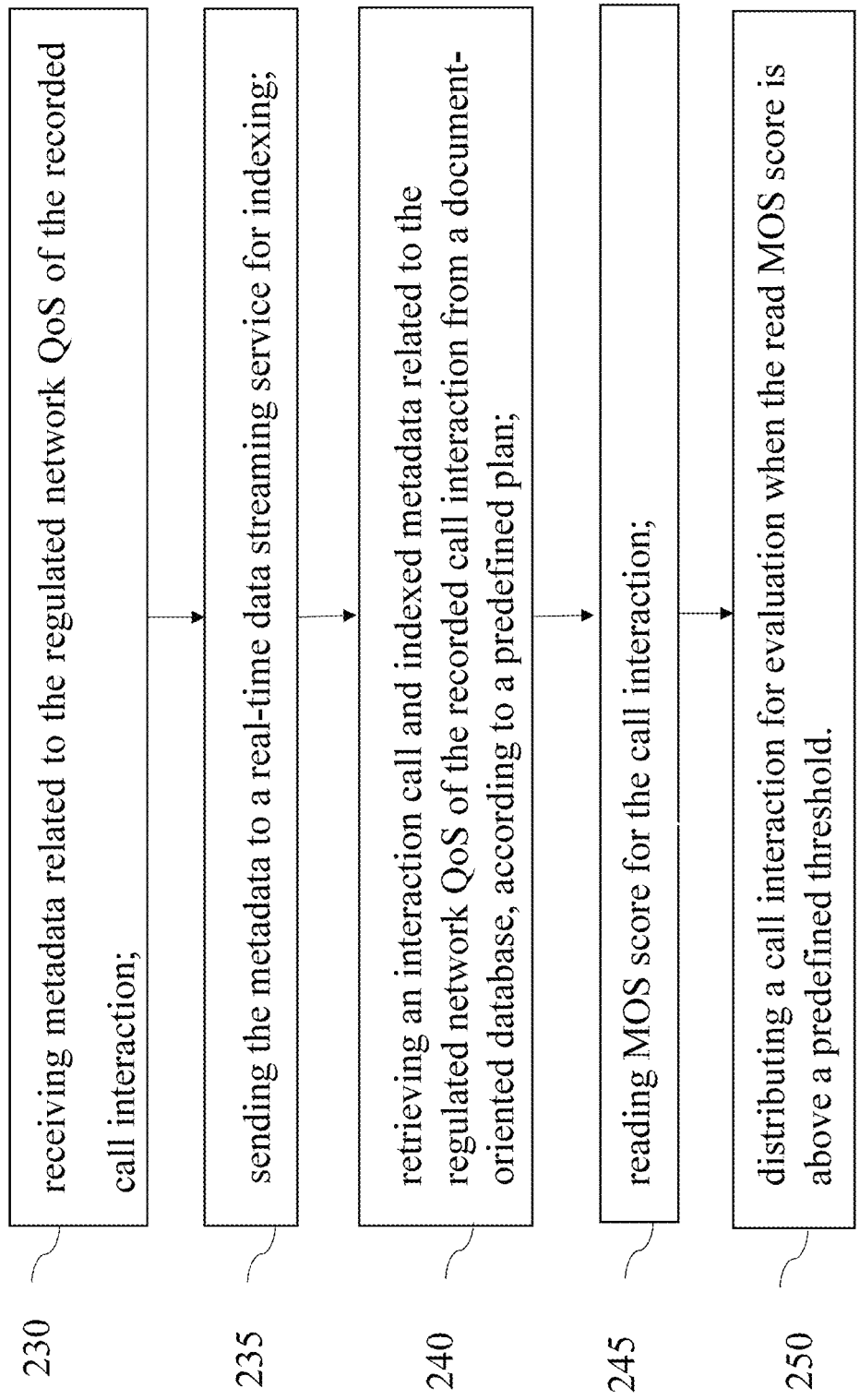

FIGS. 2A-2B illustrate a flow chart of a method 200 for preventing an evaluation of agent recording segments which are having bad customer sentiment due to low network quality of service, according to some embodiments of the disclosure.

According to some embodiments, method 200 in FIGS. 2A-2B may be implemented via a processor, a memory, an output device, an input device and communication circuitry and interface module for wired and/or wireless communication with any other computerized device over a communication network (all not shown).

According to some embodiments, in a non-limiting example, an agent may be rated based on voice recording segments of an interaction call.

According to some embodiments, the method 200 may use the processor and memory to retrieve an interaction call and indexed metadata related to the regulated network QoS of the recorded call interaction from a document-oriented database, e.g., document-oriented database 135 (shown in FIG. 1A) that is located in the cloud-based computing environment.

According to some embodiments, operation 205 may comprise controlling a received call interaction 105. The controlling of the received call interaction 105 may be operated by a Data center such as Data Center (DC) 110 in FIG. 1A. That is, Session Border Controller 115 and Media Server (MS) 120 shown in FIG. 1A.

According to some embodiments, operation 210 may comprise regulating network Quality of Service (QoS)

According to some embodiments, operation 215 may comprise storing metadata related to the regulated network QoS. The metadata may include MOS score of the voice recording segments of the call interaction.

According to some embodiments, operation 220 may comprise storing the received call interaction on a storage service when the call interaction ends. The storage service may be located in a cloud-based computing environment. In a non-limiting example, the cloud-based computing environment may be Amazon Web Services (AWS) and the storage service may be Amazon simple storage service (S3).

According to some embodiments, operation 225 may comprise extracting metadata related to the regulated network QoS of the recorded call interaction from a table-oriented database such as table-oriented database 125 in FIG. 1A. The table-oriented database may be for example, MySQL database.

According to some embodiments, operation 230 may comprise receiving metadata related to the regulated network QoS of the recorded call interaction.

According to some embodiments, operation 235 may comprise, sending the metadata to a real-time data streaming service for indexing.

According to some embodiments, operation 240 may comprise retrieving an interaction call and indexed metadata related to the regulated network QoS of the recorded call interaction from a document-oriented database. The metadata may include MOS score for the voice recording segments of the interaction call.

According to some embodiments, operation 245 may comprise reading MOS score of the voice recording segments of the call interaction by a Quality Planner MS (QPMS) such as QPMS 185 as shown in FIG. 1C.

According to some embodiments, operation 250 may comprise distributing a call interaction for evaluation of the agent who took/handled the call interaction, when the read MOS score is above a predefined threshold, according to a predefined quality plan.

Figure 3:
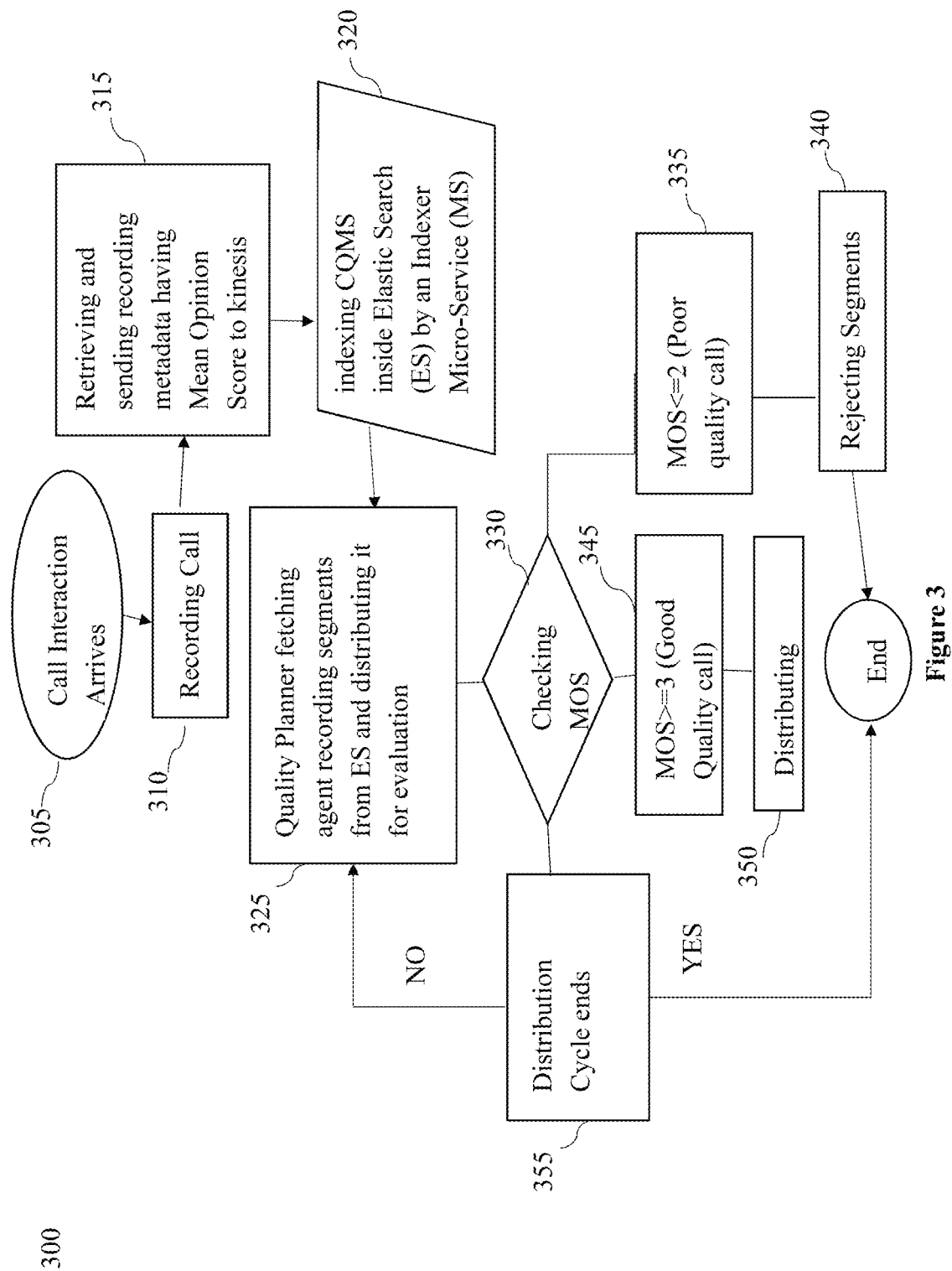
FIG. 3 illustrates a high-level diagram of a method for distributing recording of agent interaction based on network QoS, according to some embodiments of the disclosure.

FIG. 3 illustrates a high-level diagram of method 300 for distributing recording of agent interaction based on network QoS, according to some embodiments of the disclosure.

According to some embodiments, operation 305 may comprise receiving a call interaction that arrives to the Contact Center. Operation 310 may comprise recording the call. Operation 315 may comprise retrieving and sending metadata which comprises Mean Opinion Score (MOS) to a real-time data streaming service such as kinesis service of Amazon. Operation 320 may comprise indexing CQMS inside Elastic Search (ES) by an Indexer Micro-Service (MS); CQMS may comprise: MOS, RTCP data, or other available quality information at either or both endpoints.

According to some embodiments, operation 325 may comprise fetching agent recording segments from ES by Quality Planner (QP) and distributing it for evaluation, according to a predefined quality plan.

According to some embodiments, operation 330 may comprise checking MOS score. If the MOS score is equal or above a predetermined value 345 such as '3' then it means that the quality of the call is good and the agent recording segments may be distributed for evaluation of the agent. If the MOS score is equal or less than a predetermined value such as '2' then it means that the quality of the call is poor and the agent recording segments are rejected and are not sent to evaluation of the agent who conducted the call.

According to some embodiments, after checking of the MOS score in operation 330, if the distribution cycle of an active quality plan, didn't end, then method 300 continues to operation 325 which comprises fetching agent recording segments from ES and distributing it for evaluation.

According to some embodiments, the Quality Planner (QP) Micro Service (MS) may create a quality plan and assign agent interactions randomly and equally between a list of evaluators according to the quality plan definition. The required number of interactions per agent may be assigned equally during the quality plan period. The QPMS may assign agent interactions to different evaluators and not to the same evaluator.

According to some embodiments, the distribution process may be activated by the QP service scheduler every predefined amount of time e.g., 2 hours for each distribution process. Each distribution process may run through this tenant's active plans and may run a distribution cycle for each plan.

According to some embodiments, a high-level overview of a QP algorithm which may be implemented by the QPMS is provided herein. The QP algorithm may be comprised of three phases in one single cycle run. The phases may be: 1. Preparation phase; 2. Sampling phase; and 3. Assignment phase.

According to some embodiments, during the preparation phase the QP algorithm may be getting plan occurrence and collect distribution data. A user such as a manager may define a Quality Plan (QP) and assign a set of evaluators to the QP.

According to some embodiments, during the sampling phase the user such as a quality manager may fetch the result from Elastic Search (i.e., document-oriented DB) and then may filter out the interactions in which the quality of the voice recorded segments is poor.

According to some embodiments, during the assignment phase the interactions may be assigned to the list of assigned evaluators.

According to some embodiments, any recorded call interaction may be indexed in the Elastic Search (i.e., document-oriented database) along with the recording's metadata.

According to some embodiments, the QP may be created by a user such as a manager in which he may define the type of the quality plan i.e., a one-time quality plan or recurring and the duration of the QP.

According to some embodiments, the user may assign a set of evaluators to a particular QP so that whenever a distribution process starts then each evaluator is getting an equal number of voice recording segments. For example, for four call interactions and two assigned evaluators for the QP then each evaluator may get equal number of segments i.e. 2 interactions per each evaluator). This is a part of QP algorithm.

According to some embodiments, the QP algorithm may receive a list of call interactions of agents from the Elastic search and then randomly pick an agent by assigning priority to the set of agents and then assign it to evaluators.

According to some embodiments, the QP algorithm may determine the priority of the agent by the number of call interactions which are associated with the agent. For example, if a first agent has one call interaction and a second agent has three call interactions then the priority of the second agent may be higher compared to the first agent. That is, the priority of the evaluated agents may be sorted from high priority to low priority.

According to some embodiments, the priority of the evaluator may be determined by the number of interactions which are assigned for evaluations. For example, if a first evaluator has one interaction assigned to her and a second evaluator has three interactions assigned to him then the first evaluator's priority may be higher compared to the second evaluator. That is, the priority of the evaluators is sorted from low priority to high priority.

According to some embodiments, the maintained priority is to support equal distribution of the call interactions.

According to some embodiments, there may be recurring quality plans, for example, monthly or weekly, in which multiple occurrences may be created. The recurrent plans may be started once activated. At this phase such plans may not be set as pending until the beginning of the next occurrence. There will also may be one-time plans which may have a single occurrence, that will be set as expired once the quality plan has been fully handled.

According to some embodiments, future quality plans may be referred to as pending and may be ignored.

According to some embodiments the collected distribution data may include: number of days passed since the quality plan occurrence started; number of interactions that should have been assigned by now for each agent; number of interactions that were already assigned for each agent in the plan and set agent priority; total number of interaction to assign in current distribution cycle; the time period of the distribution cycle; if quality plan completion period has reached; number of interactions that have been assigned for each evaluator.

According to some embodiments, in the sampling phase, retrieving the agent's recording segments from the Elastic Search (ES) as per sampling factor and put record inside Sampled Segment table. Sampling factor is the count of total number of segments per agent and quality planner MS will pass sampling factor distribution data collected from the preparation phase to MCR Search MS and accordingly MCR Search will query ES to retrieve the information of agent's recording segments in which MOS may be stored as parameter for each segment. Based on good mean opinion score the samples will be distributed.

According to some embodiments, input data for the assignment phase of the quality plan, may store total number of interactions which have been assigned to an agent and may be distributed to an evaluator. The evaluator with lower number of segments that have been assigned may have a higher priority to receive voice recording segments for review or otherwise may be selected randomly. An agent which has the higher number of voice recording segments to be distributed for evaluation, may have a higher priority than other agents or alternatively may be randomly selected.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

The invention claimed is:

1. A computerized system using a cloud-based computing environment for preventing an evaluation of agent recording segments which are having bad customer sentiment due to low network quality of service, the system comprising:
    an Interaction Manager (IM) module in the cloud-based computing environment configured to extract metadata related to a regulated network QoS of a recorded call interaction from a table-oriented database;
    a document-oriented database in the cloud-based computing environment for storing the extracted metadata related to the regulated network QoS of the recorded call interaction that is received from the IM module, wherein the extracted metadata related to the regulated network QoS of the recorded call interaction comprising a mean opinion score (MOS); and
    a Quality Planner Micro-Service (QPMS) configured to:
        distribute a call interaction for evaluation when a read MOS is above a predefined threshold according to a predefined quality plan.

2. The computerized system of claim 1, wherein the computerized system comprising:
    a Session Border Controller (SBC) configured to:
        control of a received call interaction;
        regulate network Quality of Service (QoS); and
        send metadata related to the regulated network QoS to a table-oriented database in a cloud-based computing environment;
    a media server configured to receive the call interaction from the SBC and send it to be stored on a voice recording storage service via a recorder, when the call interaction ends,
    wherein operation of the SBC and the media server is performed before extraction of the metadata that is related to the regulated network QoS.

3. The computerized system of claim 1, wherein the computerized system further comprising an IM module that is configured to send the metadata to a real-time data streaming service for indexing by an Indexer Micro-Service (MS).

4. The computerized system of claim 1, wherein the computerized system further comprising:
    an Indexer Micro-Service (MS) in the cloud-based computing environment configured to listen to real-time data streaming service and to index and store metadata related to regulated network QoS of the recorded call interaction when new metadata arrives into the document-oriented database, after the metadata related to the regulated network QoS is extracted.

5. The computerized system of claim 1, wherein the computerized system further comprising:

a Multi-Channel Recording (MCR) unit configured to retrieve:
  an interaction call; and
  indexed metadata from the document-oriented database related to the regulated network QoS of the recorded call interaction, after the metadata related to the regulated network QoS is received; and
wherein said Quality Planner Micro-Service (QPMS) is further configured to:
  read MOS for the call interaction.

6. The computerized system of claim 1, wherein the real-time data streaming service is Amazon Kinesis Data Streams.

7. The computerized system of claim 6, wherein the IM module is configured to send the extracted metadata related to the regulated network QoS of the recorded call interaction using Amazon Kinesis Data Streams, and the Indexer Micro-Service (MS) is configured to store data read from the kinesis stream in JavaScript Object Notation (JSON) format using Index API in the document-oriented database.

8. The computerized system of claim 1, wherein the document-oriented database is ElasticSearch (ES).

9. The computerized system of claim 1, wherein the voice recording storage service is Amazon simple storage service (S3).

10. The computerized system of claim 1, wherein the table-oriented database used to store Conversational Quality Metrics (CQM) or Quality of Service (QoS) is MySQL database.

11. A computerized method using a cloud-based computing environment for preventing an evaluation of agent recording segments which are having bad customer sentiment due to low network quality of service, the method comprising:
  extracting metadata related to a regulated network QoS of a recorded call interaction from a table-oriented database;
  receiving the extracted metadata related to the regulated network QoS of the recorded call interaction, wherein the extracted metadata related to the regulated network QoS of the recorded call interaction comprising a mean opinion score (MOS); and
  distributing a call interaction for evaluation when a read MOS is above a predefined threshold, according to a predefined quality plan.

12. The computerized method of claim 11, wherein the computerized method comprising:
  controlling a received call interaction; and
  regulating network Quality of Service (QoS), before extracting the metadata that is related to the regulated network QoS.

13. The computerized method of claim 12, wherein the computerized method further comprising:
  storing metadata related to the regulated network QoS; and
  storing the received call interaction on a voice recording storage service via a recorder when the call interaction ends, after controlling the received call interaction and regulating the network Quality of Service (QoS) and before extracting the metadata that is related to the regulated network QoS.

14. The computerized method of claim 11, wherein the computerized method further comprising:
  sending the metadata to a real-time data streaming service for indexing;
  retrieving an interaction call and indexed metadata related to the regulated network QoS of the recorded call interaction from a document-oriented database; and
  reading MOS for the call interaction, after the metadata related to the regulated network QoS is received.

* * * * *